Nov. 27, 1934.   A. H. TAYLOR ET AL   1,981,884
SYSTEM FOR DETECTING OBJECTS BY RADIO
Filed June 13, 1933   3 Sheets-Sheet 1
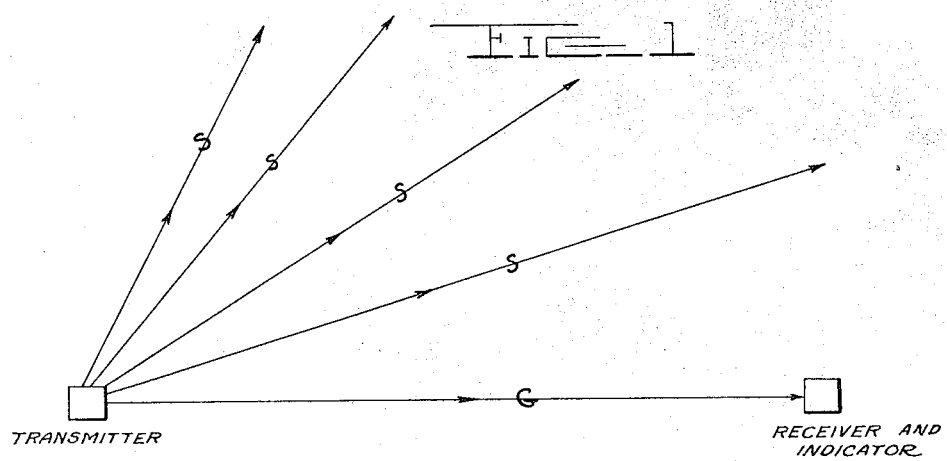
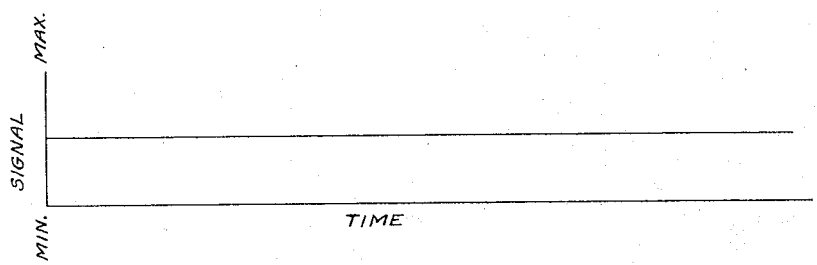
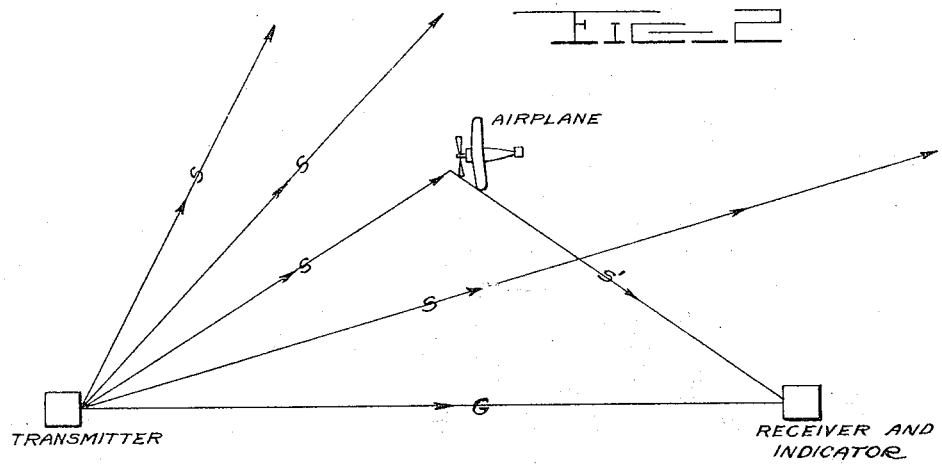
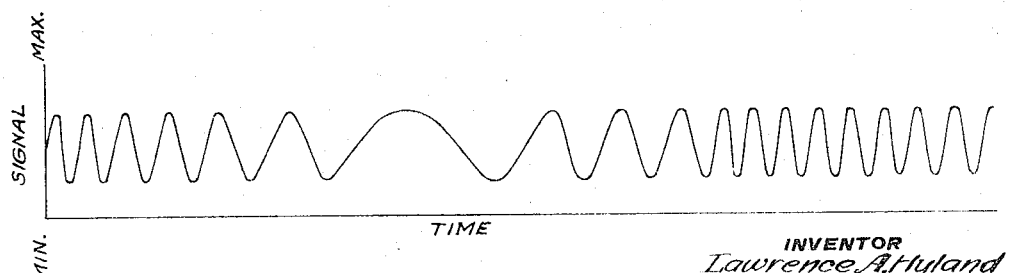
INVENTOR
Lawrence A. Hyland
Albert H. Taylor
BY Leo C. Young
ATTORNEY

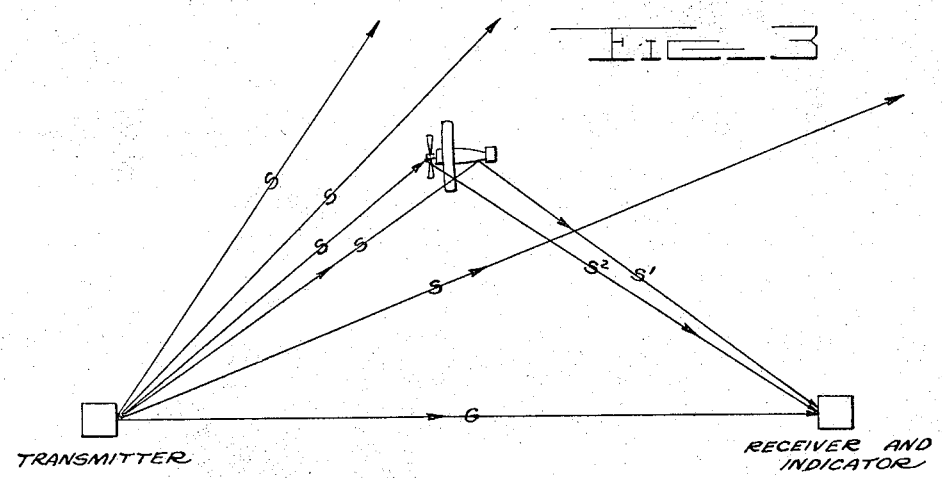
FIG. 3
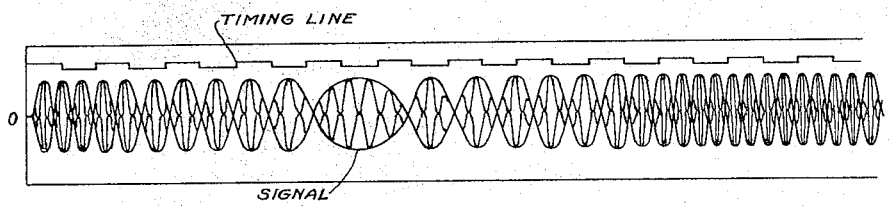
TIMING LINE
SIGNAL
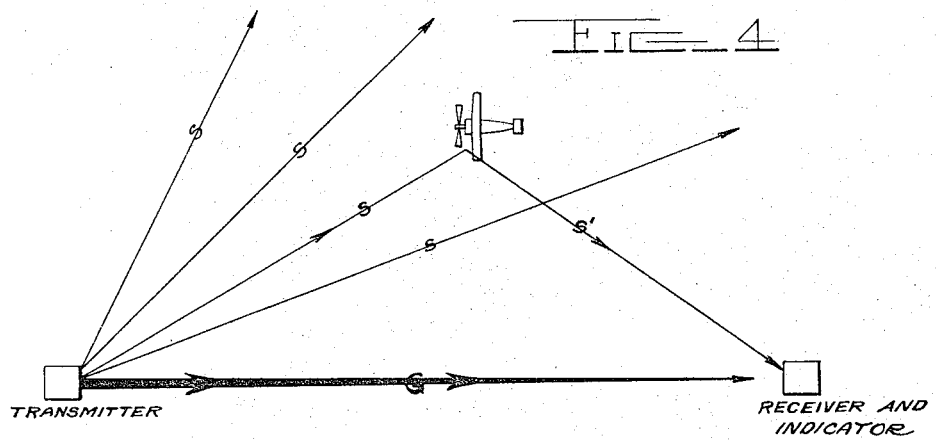
FIG. 4
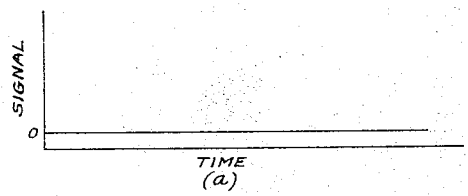
(a)
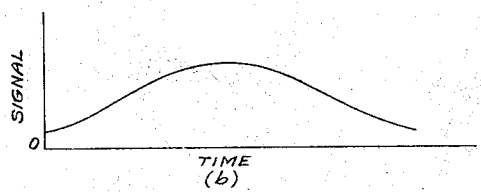
(b)
INVENTOR
Lawrence A. Hyland
Albert H. Taylor
BY Leo C. Young
ATTORNEY Nov. 27, 1934.  A. H. TAYLOR ET AL  1,981,884
SYSTEM FOR DETECTING OBJECTS BY RADIO
Filed June 13, 1933   3 Sheets-Sheet 3
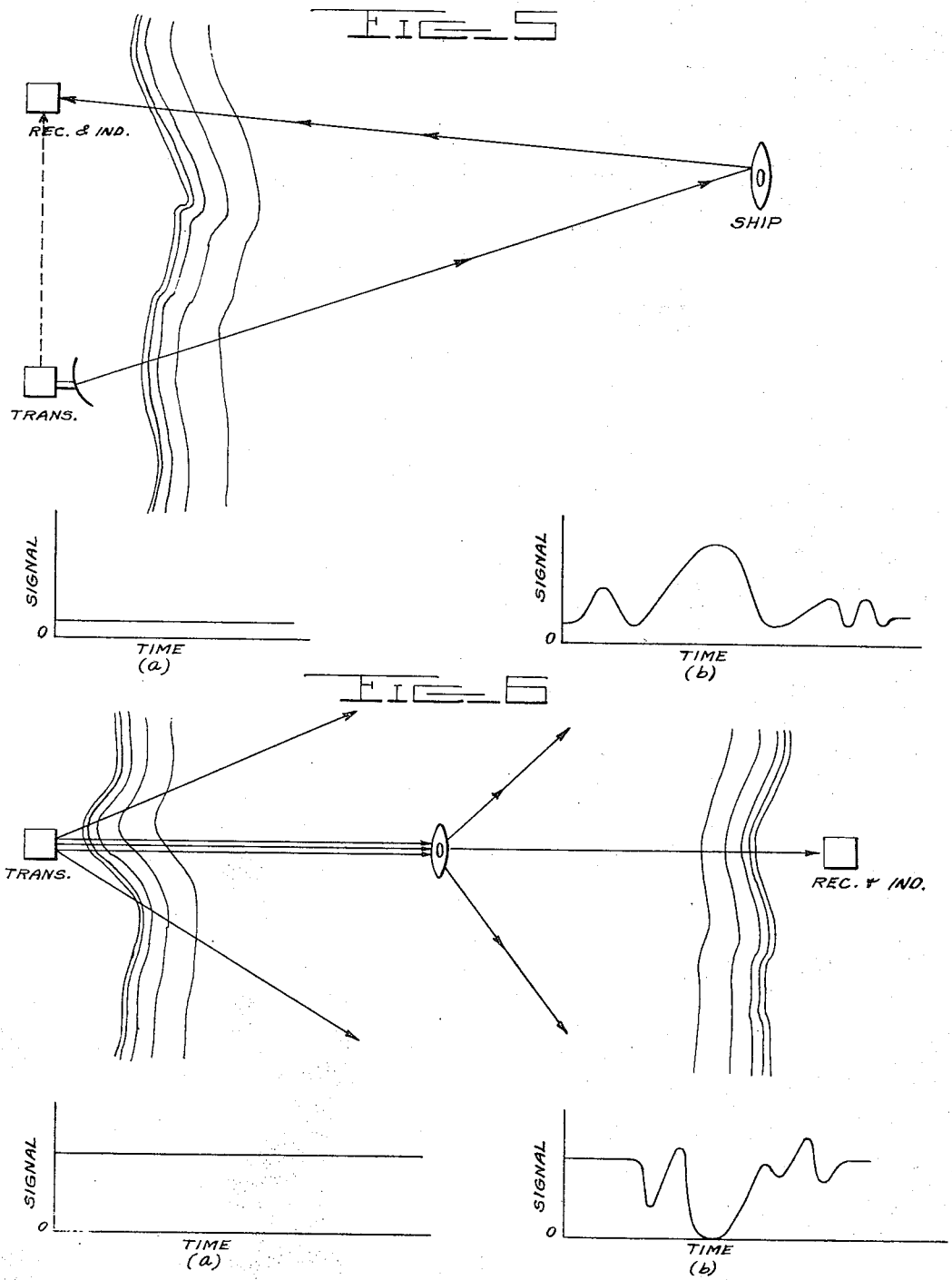
INVENTOR
Lawrence A. Hyland
Albert H. Taylor
BY Leo C. Young
ATTORNEY Patented Nov. 27, 1934

1,981,884

UNITED STATES PATENT OFFICE 1,981,884

SYSTEM FOR DETECTING OBJECTS BY RADIO

Albert H. Taylor, Leo C. Young, and Lawrence A. Hyland, Washington, D. C.

Application June 13, 1933, Serial No. 675,624

12 Claims. (Cl. 250—2)

(Granted under the act of March 3, 1883, as amended April 30, 1928; 370 O. G. 757)

This invention relates to a method of and means by which moving objects in the air or on the surface of the earth may be detected by the employment of radio receiving and transmitting equipment.

An object of this invention is to utilize the ground and other components of radiation commonly known as sky waves emitted by a radio transmitter and received in an indicating radio receiver so as to indicate the presence of an airplane or other motive vehicle when within the vicinity of the transmitter-receiver or when within the electromagnetic field created by said transmitter.

Another object of this invention is to so induce currents in intervening objects of a size comparable to the half wave length of the wave emitted by a radio transmitter that the radiated energy commonly called reradiation resulting from said induced currents and the energy received directly from the transmitter create a wave interference pattern which will be indicated by a characteristic signal in the receiver.

With the above and other objects in view, this invention consists in the construction, combination and arrangement of parts as will be hereinafter more fully described.

Reference is to be had to the accompanying drawings forming a part of this specification, in which like reference characters indicate corresponding parts throughout the several views, and in which:

Fig. 1 illustrates the use of a radio transmitter and receiver with a graph of received signal strength plotted against time;

Figs. 2, 3 and 4 illustrate the use of a radio transmitter and receiver in the detection of an intervening object in the air, such as an airplane, and a graph of received signal strength plotted against time;

Fig. 5 shows a radio transmitter and receiver used in detecting an object, such as a ship, off the shore; and Fig. 6 illustrates the use of a radio transmitter and receiver mounted on opposite shores of a river, or conceivably on two ships, detecting the presence of an intervening ship and the graph of received signal strength versus time.

The elements of this detection system comprise a transmitter energizing an antenna, a receiver remotely situated with respect to the said transmitter and energized by a suitable receiving antenna, and an indicating device such as headphones or a meter by which the received signals may be rendered intelligible.

The phenomena upon which this invention operates is based upon the transmission of radio waves which may or may not be directional, the reradiation of those waves by an intervening object and the reception of the primary, as well as the reradiated waves by a receiver remotely situated with respect to the transmitter. As will be shown, the detection of intervening objects is accomplished either by properly receiving and interpreting the interference pattern created by the interaction of the ground waves as sent out from the transmitter and the reradiated waves from the intervening objects, such as an airplane, motive vehicle, or vessel, or by eliminating the said ground waves and adjusting the receiver to actuation only by the reradiated sky waves.

In connection with the foregoing, it is desired to point out the distinction between reradiation and reflection. In the previously issued patents directed along similar lines, reflection has been the basic phenomenon. These patents, in every case, have to do with the location of objects or the determination of altitude by means of reflected waves and in the usual case show the waves leaving the airplane transmitter, being reflected by the earth, and received on a receiver or group of receivers in the airplane. Determination of altitude is theoretically made by means of the intensity of the reflection as indicated in the receiver or receivers.

It should be noted, however, that the phenomena upon which the present disclosure is based specifically relate to reradiation, an entirely separate and distinct phenomenon from reflection. For instance, the sound from a tuning fork may strike a non-resonant surface such as a wall and be reflected therefrom generally in accordance with the well known principle that the angle of reflection is equal to the angle of incidence, considering the wall as a plane surface. In general, reflection takes place where the reflecting agent is large with respect to the wave length involved as, in the case of radio phenomena, the surface of the earth, the sea, a mountain side or the Heaviside layer. On the other hand, the sound waves from a tuning fork may serve to excite a properly tuned violin string at a distance and the violin then reradiate the energy from the tuning fork. In this case, the violin string must be tuned to the fundamental frequency or some harmonic of that emitted by the tuning fork and its dimensions are governed to a considerable degree by the wave length of the source of energy.

Substituting the fuselage of an aircraft, or the surfaces presented by any moving object, for the violin string, it is readily conceivable that upon such fuselage or object entering and moving through a high frequency electromagnetic field, an oscillating current will be set up in said fuselage, or other structure, when one of its physical dimensions, usually its longitudinal dimension, corresponds to some multiple or sub-multiple of the wave length employed in producing the electromagnetic field. The experimental condition of maximum response of the structure to such influence is when its length corresponds approximately to one-half wave length of the frequency of the surrounding electromagnetic field. Such induced oscillatory currents set up in the fuselage, or other metallic structure, then radiates of its own accord and the re-radiating structure becomes the source of a secondary spherical electromagnetic field which may be detected by a sensitive receiver in the usual manner either as a single radiation of itself or as creating at the receiver an interference pattern with the direct reception from the transmitter creating the original or primary electromagnetic field. This secondary electromagnetic field from the radiating structure is readily distinguishable experimentally from a field following the laws of pure reflection.

Considering the general principles above mentioned that reflection occurs from plane surfaces large with respect to the wave length employed, whether the reflected energy be in the form of sound, light, or electromagnetic waves, and that in connection with such reflecting surfaces, the angles of incidence and reflection are equal, it is obvious that the invention hereinafter described and claimed is based on another phenomenon than that of simple reflection and that phenomenon as described above we term re-radiation.

The use of the radio transmitter and receiver is shown in Fig. 1. The ground wave G is picked up in the receiver while the other components of radiation S, commonly known as sky waves, are shown leaving the transmitter and going out into space. The record of the signal as received is indicated on the plot just below the transmitter and receiver. There being no intervening or adjacent object, this record is seen to be a straight line of uniform intensity.

A similar radio transmitter and receiver is shown in Fig. 2. The ground wave G is received as before but some of the components of the sky wave S are being intercepted and reradiated by an airplane flying in the vicinity of the transmitter and receiver, as shown by S'. During the time of travel of the airplane, which for the purpose of illustration is considered to fly along a line directly above a line connecting the transmitter and receiver, the signals in the receiver will vary substantially as shown in the graph. When the airplane is over either the transmitter or the receiver, the signals will vary rapidly, while at a point intermediate between the two, the variations are slower.

In Fig. 3 is shown the ordinary phenomenon plus that due to propeller effect, $S^2$. The interference due to reradiation from the airplane is considered to be the interference of a wave of fixed polarization and the ground wave which is also of a fixed polarization. The interference due to the propeller effect is in a different category, since the changing position of the propeller constantly changes the polarization of its reradiated wave. The influence of this periodical shifting polarization on the normal interaction of the reradiated waves and the ground waves gives rise to an independent variation. There are consequently two variations taking place, a major one due to the airplane reradiation and a superimposed one due to the changing polarizations of the propeller reradiation. This is clearly shown by the examination of oscillograph records which also show that the rate of the propeller variation is a summation of the propeller revolution frequency plus the rate of variation due to the airplane's travel. The combination of these two factors as recorded on the oscillograph is indicated on the graph of Fig. 3. It can be seen that this phenomenon could readily be applied to the identification of intervening or adjacent objects as a differentiation between an aircraft having a moving metal member and a surface craft such as an automobile, tank, or a vessel.

An additional feature over those shown in Fig. 2 is illustrated in Fig. 4. The same transmitter-receiver arrangement is used as before, with the exception that the ground wave G is now attenuated to zero intensity before it reaches the receiver. The sky wave is unaffected by such attenuation, however, and its components, S, continue to be of comparatively greater intensity. Graph (a) illustrates the non-varying zero intensity signal as received when no object is between the transmitter and receiver. When the airplane flies within their vicinity, however, it reradiates some of the components of the sky wave, S', and the signal increases in intensity, as shown in graph (b).

The use of a directional radio transmitter and receiver for the detection of a ship off shore is shown in Fig. 5. The directional transmitter emits a beam of energy in the direction shown. When no reradiating mechanism such as a ship is in the path of this beam, the signal received will be of constant and low intensity, as shown in graph (a). When a ship intercepts the path of the beam, however, a substantial increase in the received signal is obtained and the general record of this signal will be substantially as shown in graph (b).

In Fig. 6 is shown another combination wherein the transmitter is located on one bank of a river and the receiver on the opposite bank. The transmitting antennae may or may not be of the directional beam type. The signal level during the time that no reradiating or interfering mechanism is passing between the transmitter and receiver is of a high value and uniform in intensity, as shown in graph (a). When a ship comes between the transmitter and the receiver, a violent fluctuation takes place in the received signal, as shown in graph (b). This fluctuation is distinguished by an absence of signal for certain positions of the ship. While this combination has been described as being installed on the banks of a river, its application could readily be extended to the apparatus being placed wholly on ships whereby a ship passing between two vessels so equipped would indicate its presence. It follows naturally that an extension of this system could be profitably employed by scouting craft, thus effectively increasing the present distance required between scouts, as well as obviating the necessity of the scouting line retiring during the night.

These detection phenomena have been observed with directional and non-directional transmitting or receiving antennae and combinations of both. Special combinations of antennae are employed for individual problems. For instance, if it is desired to locate accurately when air airplane passes over a specified point, a vertical beam transmitting antenna is employed together with a non-directional receiving antenna some distance away. When it is desired to detect the time at which a moving object passes across a certain line, a horizontal beam antenna is employed together with a receiving antenna which may be either directional or non-directional, as desired.

It will be understood that the above description and accompanying drawings comprehend only the general and preferred embodiments of our invention, and that various changes in the construction, proportion and arrangement of parts may be made within the scope of the appended claims without sacrificing any of the advantages of this invention. It must be further understood that, while, for conditions of maximum response, certain assumptions have been made as to the relationship between the wave length of the primary electromagnetic emission and the principal physical dimension of the intervening or adjacent structure, we are not limited to any such definite relationship.

The herein described invention may be manufactured and used by or for the Government of the United States of America for governmental purposes without the payment of any royalty thereon.

What we claim as new and desire to secure by Letters Patent of the United States is:

1. A system for the detection of moving objects, comprising a radio transmitter, a radio receiver remotely situated with respect to said transmitter capable of constantly receiving the ground waves emitted by said transmitter and intermittently receiving the sky waves emitted by said transmitter, a moving object intervening or adjacent said transmitter and receiver, and a device connected to said receiver for indicating a signal of uniform intensity produced by the uninterrupted reception of said ground waves and for indicating a signal of variable amplitude produced by an interference pattern set up by the interference of said ground waves with the reradiated sky waves of said transmitter, said reradiated sky waves emanating from said intervening or adjacent object.

2. A system for the location of moving objects, comprising a radio transmitter, a radio receiver remotely situated with respect to said transmitter capable of constantly receiving the ground waves emitted by said transmitter and intermittently receiving the sky waves emitted by said transmitter, a moving object intervening or adjacent said transmitter and receiver, and means connected to said receiver for indicating a signal of uniform intensity produced by the uninterrupted reception of said ground waves and for indicating a signal of periodically variable amplitude produced by a characteristic interference pattern set up by the interference of said ground waves with the reradiated sky waves of said transmitter, said reradiated sky waves emanating from said intervening or adjacent object at a certain distance and in a certain direction from said receiver as indicated by a characteristic received signal.

3. A system for the location of moving objects, comprising a radio transmitter, a radio receiver remotely situated with respect to said transmitter capable of constantly receiving the ground waves emitted by said transmitter and intermittently receiving the sky waves emitted by said transmitter, an object intervening or adjacent said transmitter and receiver, and a device connected to said receiver for indicating a signal of uniform intensity produced by the uninterrupted reception of said ground waves and for indicating a signal of variable amplitude and frequency produced by the reception of a composite wave created by the interference at the said receiver between the said ground waves and the reradiated sky waves of said transmitter emanating from said intervening or adjacent object, said variable signal varying in amplitude at a frequency determined by the proximity of the intervening or adjacent object.

4. A system for the identification and location of aircraft, comprising a radio transmitter, a radio receiver remotely situated with respect to said transmitter capable of constantly receiving the ground waves emitted by said transmitter and intermittently receiving the sky waves emitted by said transmitter, an aircraft intervening or adjacent said transmitter and receiver, and a device connected to said receiver for indicating a signal of uniform intensity produced by the uninterrupted reception of said ground waves and for indicating a signal of variable amplitude and frequency produced by the reception of a composite wave created by the interference at said receiver between said ground waves and the reradiated sky waves from said transmitter, said reradiated sky waves emanating as waves of fixed polarization from the fuselage of the aircraft and waves of a variable polarization from the propeller of said aircraft.

5. A system for the detection of moving objects, comprising a radio beam transmitter, a non-directional radio receiver remotely situated with respect to said transmitter capable of constantly receiving the ground waves emitted by said transmitter and intermittently receiving the sky waves emitted by said transmitter, an object intervening or adjacent said transmitter and receiver, and a device connected to said receiver for indicating a signal of uniform intensity produced by the uninterrupted reception of said ground waves and for indicating a signal of variable amplitude produced by an interference pattern set up in said receiver by the interference of said ground waves with the reradiated sky waves of said transmitter, said reradiated sky waves emanating from said intervening or adjacent object.

6. A system for the detection of moving objects, comprising a radio transmitter adapted for attenuation of the ground wave component of its emission, a radio receiver remotely situated with respect to said transmitter capable of being maintained in a constantly receptive condition at the frequency used by said transmitter, an object intervening or adjacent said transmitter and receiver, and a device connected to said receiver for indicating a zero intensity signal as occurs when there is no intervening or adjacent object and for indicating a signal intensity of variable amplitude produced by the detection and reception of the reradiated sky waves of said transmitter, said reradiated sky waves emanating from said intervening or adjacent object.

7. A system for the identification and location of aircraft, comprising a radio transmitter adapted for attenuation of the ground wave component of its emission, a radio receiver remotely situated with respect to said transmitter capable of being maintained in a constantly receptive condition at the frequency used by said transmitter an aircraft intervening or adjacent said transmitter and receiver, and a device connected to said receiver for indicating a zero intensity signal as occurs when there is no intervening or adjacent aircraft and for indicating a signal of variable amplitude and frequency produced by the reception of a composite wave created by the interference at said receiver between the variously polarized components of the reradiated sky waves of said transmitter, said reradiated sky waves emanating as waves of fixed polarization from the fuselage of the aircraft and waves of a variable polarization from the propeller of said aircraft.

8. In a system for the detection of air, land and water craft, the method which comprises transmitting electromagnetic impulses consisting of ground and sky wave components of radiation so as to produce reradiated electromagnetic waves from an intervening or adjacent craft such that said ground and reradiated waves will set up an interference pattern at a point and detecting said interference pattern which after detection serves to indicate the proximity of said craft.

9. In a system for the identification and location of aircraft, the method which comprises transmitting electromagnetic impulses consisting of ground and sky wave components of radiation so as to produce reradiated electromagnetic waves of fixed polarization from the fuselage and reradiated electromagnetic waves of a variable polarization from the propeller of an aircraft such that said ground and reradiated waves will form a characteristic composite wave and detecting said composite waves whereby said detection produces a characteristic signal indicative of the presence and location of an aircraft.

10. In a system for the detection and location of intervening and adjacent objects, the method which comprises transmitting distantly electromagnetic impulses consisting solely of the sky wave component of radiation, attenuating the ground wave component of radiation of said transmission, inducing electromagnetic energy in said intervening and adjacent object which induced electromagnetic energy is reradiated in an earthly direction and detection of said earthly directed reradiated waves at a point remotely situated with respect to the source of said electromagnetic impulses, said detection producing a characteristic radio signal indicative of the presence and location of an intervening or adjacent object.

11. In a system for the detection of aircraft, the method which comprises transmitting radio frequency electromagnetic impulses at a frequency whose half wave length corresponds to the physical dimensions of said aircraft, inducing electromagnetic energy in the metallic portion of said aircraft which said induced electromagnetic energy is reradiated from said aircraft in the form of a reradiated electromagnetic waves of the same frequency as the said electromagnetic impulses, and detecting said reradiated electromagnetic waves at a point remotely situated with respect to the source of said electromagnetic impulses.

12. In a system for the detection of intervening or adjacent air, land and water craft, the method which comprises transmitting radio frequency electromagnetic impulses consisting of ground and sky wave components of radiation, setting up oscillatory currents in said craft by means of said electromagnetic impulses and detecting the interference pattern created by the ground waves of said electromagnetic impulses and the radiated component of said oscillatory currents at a point remote from the source of said electromagnetic impulses which said interference pattern after detection serves to indicate the proximity of said craft.

ALBERT H. TAYLOR.
LEO C. YOUNG.
LAWRENCE A. HYLAND.